F. S. NORTH.
SHAFT BEARING.
APPLICATION FILED DEC. 26, 1911.

1,214,062.

Patented Jan. 30, 1917.

WITNESSES
Fenton S. Belt
Grace P. Brereton

INVENTOR
Francis S. North
By Sturtevant & Mason
Attorney

UNITED STATES PATENT OFFICE.

FRANCIS S. NORTH, OF CHICAGO, ILLINOIS, ASSIGNOR TO UNION SPECIAL MACHINE COMPANY, OF CHICAGO, ILLINOIS, A CORPORATION OF ILLINOIS.

SHAFT-BEARING.

1,214,062.  Specification of Letters Patent.  Patented Jan. 30, 1917.

Application filed December 26, 1911. Serial No. 667,649.

*To all whom it may concern:*

Be it known that I, FRANCIS S. NORTH, a citizen of the United States, residing at Chicago, in the county of Cook, State of Illinois, have invented certain new and useful Improvements in Shaft-Bearings, of which the following is a description, reference being had to the accompanying drawing and to the letters and figures of reference marked thereon.

My invention relates to improvements in shaft bearings, it being designed particularly as a bearing for the main shaft of sewing machines, the object being to provide a bearing for such shaft in which friction shall be reduced to a minimum, and in which the bearings can be readily removed and replaced by others in case of wear.

The invention therefore, consists primarily in a bearing for shafts comprising the framework through which the shaft extends, said framework being adapted for the reception of the ball retainers, one of said ball retainers securely fitting the recess provided for it, and the other recess being provided with a clearance for its retainer, with a sleeve surrounding the shaft extending between the inner retainers, and with means for holding said retainers in position.

The invention also consists in connection with the above, of a special construction of sewing machine frame adapted to receive and thoroughly clamp the adjustable retainer.

Furthermore, the invention consists in the matters hereinafter described and referred to in the appended claims.

Figure 1:
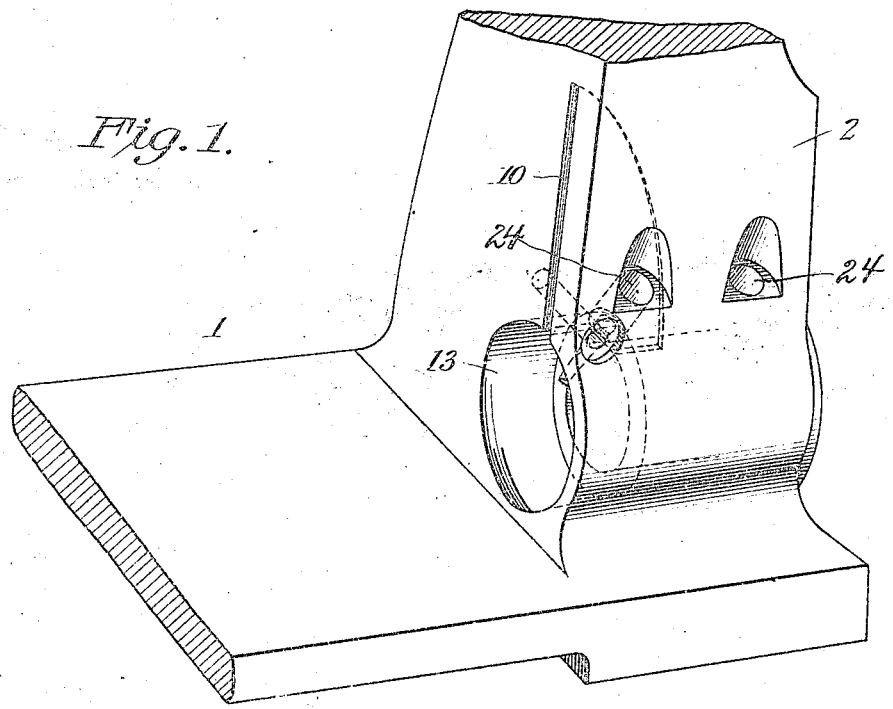
Figure 2:
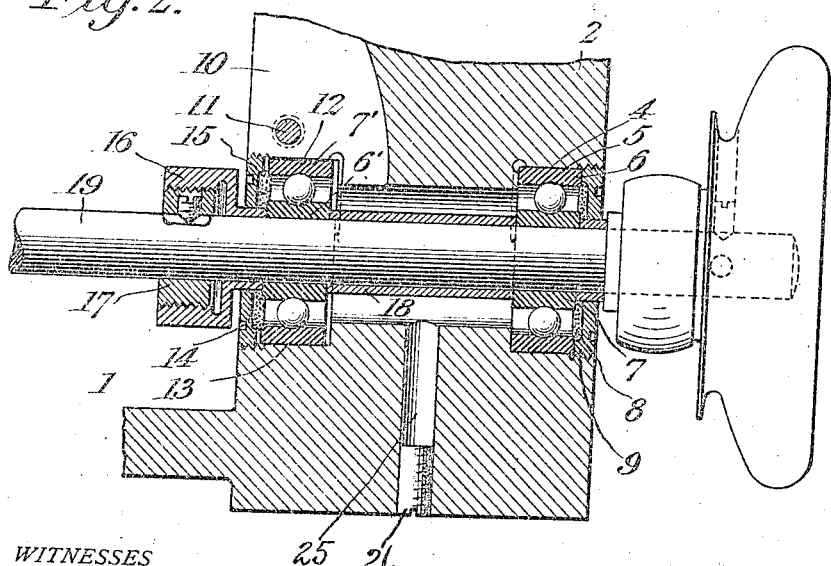

The invention is illustrated in the accompanying drawing, in which,

Figure 1 is a perspective view of a sewing machine head or casting, constructed to receive my improved bearing arrangements for the main shaft; Fig. 2 is a vertical section through the bearings and a portion of the frame, illustrating my shaft bearing.

In these drawings, 1 represents as a whole, the bed casting of a sewing machine having the usual upright standard 2, and overhanging arm. The upright standard 2 is bored in the usual manner to receive the main shaft, and at its rear end or the part adjacent the belt wheel of the machine, is provided with a shouldered recess 4, to receive the ball retainer 5, which is composed of the outer ring 6 and the inner ring 7, with the balls in between, said retainer 5 being held in position in the recess by means of the felt washer 8 and the screw washer 9, these bearing against the outer ring. Upon the other side of the standard, above the bore or opening and extending in for a considerable depth, a vertical cut or recess is formed as shown at 10, the outer wall of which is provided with a screw opening in which is threaded a screw 11 bearing in the body part of the casting, this screw serving when driven home, to spring the metal somewhat and hold the ball retainer 12 rigidly in position. This ball retainer 12 opposite the ball retainer 5 is composed of inner and outer rings 6', 7', and fits in a recess 13 corresponding to the recess 4, upon the opposite end of the standard, but said recess 13 is deeper than the recess 4, in order that a clearance may be left for the outer ring 7', against which bears the felt washer 14, held by a screw washer 15. A locking nut 16 is screwed on the threaded collar 17 fixed on the shaft, and has a hub extending through the screw washer 15 bearing against the inner ring 6'.

Between the two locked inner rings 7 and 6' is a sleeve 18 surrounding the shaft 19. When the locking nut is screwed up, the part 6' of the retainer 12 bears firmly against the sleeve which bears against the part 7 of the retainer 5, and holds these parts rigidly together. By reason of having the outer ring 7' of the ball retainer 12 formed with a clearance between it and the wall of the recess between which it fits, that is, as I term it, having it floating, said retainer may be adjusted to any desired position, and wear may be taken up, as desired.

The length of the sleeve 18 is slightly greater than the distance between the shoulders of the bores 4 and 13, thus permitting a positive longitudinal clamping of the parts mounted directly on the shaft 19. After clamping the parts, the screw 11 is driven home thereby binding the ring 7' against rotation.

Should the ball retainers wear, new wearing surfaces are readily presented, by simply loosening the cone pointed screw of the belt wheel about one-quarter turn, and screwing up the nut 16.

I have provided two dust protected oil holes 24 leading down into the sides of the races, as shown in Fig. 1, and as shown in Fig. 2, I have provided a cleaning hole 25 closed by a screw. This is provided to allow benzin, or other cleaning material to be flushed through the oil holes to wash out any accumulations of dust or dirt into the pocket 25 and by removing the plug or screw 26, the channels which are liable to fill with dirt and sediment, may be completely flushed out.

Having thus particularly described my invention, what I claim as new and desire to secure by Letters Patent, is:—

1. The combination of a supporting frame having an opening therethrough, said opening being enlarged at each end thereof to form a seating recess for a ball retainer, a ball retainer in each recess, each of said ball retainers comprising inner and outer rings and balls between the rings, a main shaft extending through the inner rings, a collar fixed to the shaft and engaging the inner ring of one of said ball retainers, a sleeve on the shaft between the inner rings of the ball retainers, a second collar secured to the shaft, a threaded nut engaging said collar and bearing against the inner ring of the ball retainer for clamping said ring against said sleeve and said sleeve against the inner ring of the first named ball retainer, whereby said inner rings of the ball retainers are secured to the shaft, said supporting frame having a slot extending into the enlarged recess at the end of the opening adjacent said threaded nut, and means for drawing the walls of said slot together to clamp the outer ring of the ball retainer in adjusted positions.

2. The combination of a supporting frame having an opening therethrough, said opening being enlarged at each end thereof to form a seating recess for a ball retainer, a ball retainer in each recess, each of said ball retainers comprising inner and outer rings and balls between the rings, a main shaft extending through the inner rings, a collar fixed to the shaft and engaging the inner ring of one of said ball retainers, a sleeve on the shaft between the inner rings of the ball retainers, a second collar secured to the shaft, a threaded nut engaging said collar and bearing against the inner ring of the ball retainer for clamping said ring against said sleeve and said sleeve against the inner ring of the first named ball retainer, whereby said inner rings of the ball retainers are secured to the shaft, said supporting frame having a slot extending into the enlarged recess at the end of the opening adjacent said threaded nut, means for drawing the walls of said slot together to clamp the outer ring of the ball retainer in adjusted positions, and screw washers for closing the outer ends of the enlarged recesses at each end of said opening.

In testimony whereof I affix my signature, in presence of two witnesses.

FRANCIS S. NORTH.

Witnesses:
   A. C. ABEL,
   A. B. CLOTHIER.